United States Patent
Magarill et al.

(10) Patent No.: US 6,764,181 B2
(45) Date of Patent: Jul. 20, 2004

(54) POLARIZATION ARRANGEMENT

(75) Inventors: Simon Magarill, Cincinnati, OH (US);
John D. Rudolph, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/147,274

(22) Filed: May 16, 2002

(65) Prior Publication Data

US 2003/0058408 A1 Mar. 27, 2003

Related U.S. Application Data

(60) Provisional application No. 60/292,178, filed on May 18, 2001.

(51) Int. Cl.[7] .................. G03B 21/14; G02B 27/28; G02B 1/10; G02B 6/26
(52) U.S. Cl. .................. 353/20; 359/489; 359/495; 359/583; 385/47
(58) Field of Search .................. 359/486, 489, 359/495, 483, 583; 353/20; 385/47

(56) References Cited

U.S. PATENT DOCUMENTS

| | | | |
|---|---|---|---|
| 5,060,058 A | * 10/1991 | Goldenberg et al. | 348/752 |
| 5,327,270 A | 7/1994 | Miyatake | |
| 5,400,093 A | * 3/1995 | Timmers | 353/101 |
| 5,675,414 A | * 10/1997 | Rowell et al. | 348/745 |
| 5,946,054 A | * 8/1999 | Sannohe et al. | 353/20 |
| 5,988,818 A | * 11/1999 | Fujimori et al. | 353/119 |
| 6,122,103 A | 9/2000 | Perkins et al. | |
| 6,234,634 B1 | * 5/2001 | Hansen et al. | 356/450 |
| 6,243,199 B1 | * 6/2001 | Hansen et al. | 359/486 |
| 6,288,840 B1 | * 9/2001 | Perkins et al. | 359/486 |
| 6,447,120 B1 | * 9/2002 | Hansen et al. | 353/119 |
| 6,597,504 B2 | * 7/2003 | Dubin et al. | 359/487 |

FOREIGN PATENT DOCUMENTS

WO   WO 01/09677   2/2001

OTHER PUBLICATIONS

Smith, Warren J., Modern Optical Engineerin: The Design of Optical Systems, 1990, McGraw–Hill, Inc., 2nd edition, p. 99.*

Smith, Warren J., *Modern Optical Engineering: The Design of Optical Systems*, 2nd edition, in the Optical and Electro–Optical Engineering Series, Robert E. Fischer and Warren J. Smith, series editors, McGraw–Hill, New York, 1990, p. 96–99 and 145–148.

* cited by examiner

Primary Examiner—Russell Adams
Assistant Examiner—Magda Cruz
(74) Attorney, Agent, or Firm—Bruce E. Black

(57) ABSTRACT

A tilted polarization splitter (13) for use with a projection lens (15) and a light modulating panel (11) is provided. The polarization splitter has an ultra thin substrate (14) whose thickness is chosen so that the depth of focus of the projection lens in imager space is greater than the astigmatism produced by the splitter at its tilted angle. The polarization splitter can be a wire grid polarizer, polarization coating, or birefringence film carried by or formed on the ultra thin, plane parallel plate substrate.

21 Claims, 2 Drawing Sheets

POLARIZATION ARRANGEMENT

CROSS REFERENCE TO RELATED PROVISIONAL APPLICATION

This application claims the benefit under 35 USC §119(e) of U.S. Provisional Application No. 60/292,178, filed May 18, 2001, the contents of which are incorporated herein in their entirety.

FIELD OF INVENTION

This invention relates to projection optical devices for use with reflective liquid crystal displays, e.g., LCoSs. More particularly, the invention relates to an arrangement of polarization components designed to work with reflective liquid crystal displays and maintain an effective separation of illuminating light and reflective light.

DESCRIPTION OF PRIOR ART

Reflective liquid crystal displays (e.g., LCoS displays—Liquid Crystal on Silicon displays) work with polarized light in accordance with the following: "off" pixels of the display reflect light without changing its polarization state and "on" pixels rotate the polarization of the illuminating light by 90 degrees. (Alternatively, "on" pixels can leave the polarization unchanged and "off" pixels can rotate the polarization, but the "off" equal no change in polarization and "on" equal a change in polarization is, in practice, the most common approach.) A known optical layout of polarization components is shown in FIG. 1. See Miyatake, U.S. Pat. No. 5,327,270, entitled "Polarizing Beam Splitter Apparatus and Light Valve Image Projection System" which issued on Jul. 5, 1994, the content of which is incorporated herein by reference.

In the layout of FIG. 1, illuminating light 8 passes through an initial polarizer 9 (S polarizer) and is reflected from the diagonal of a polarization beam splitter 3 (PBS). This light illuminates LCoS 11. Light reflected from "off" pixels has the same polarization as the incident light and is reflected from the PBS diagonal back into the illumination system. Light reflected from "on" pixels has a polarization orthogonal to the polarization of incoming light. That light is transmitting through the PBS diagonal and enters into the projection lens of the system (see light 17 in FIG. 1). It should be noted that in this layout, illuminating light 8 and imaging light 17 can be reversed, with the illuminating beam passing through the diagonal of the PBS and the imaging beam reflecting from the diagonal.

The PBS diagonal has a multi-layer structure, which is designed to reflect S polarization and to transmit P polarization. The typical reflection factor for P polarization is ~12%, which reduces the contrast of the system. The initial polarizer 9 in front of the PBS 3 absorbs light with P polarization to maintain the contrast at the required level.

The cone of light from the illuminator typically has an F-number equal to 2.8, which creates a significant depolarization effect for skew rays. This geometrical effect is described in the Miyatake patent referred to above and requires a quarter wave plate 5 between the PBS 3 and the reflective liquid crystal display 11 (e.g., LCoS) to maintain high contrast.

The main drawbacks of this polarization layout are the high cost of the PBS and the need to use a quarter wave plate, which requires a very precise angular alignment in order to reduce the skew ray problem. Also, quarter wave plates are very sensitive to temperature which creates non-uniformities in contrast across the imager.

SUMMARY OF INVENTION

To address the foregoing deficiencies in the art, the invention provides an optical system (polarization arrangement) comprising:

(a) a light modulating panel;

(b) a projection lens for forming an image of the light modulating panel, said projection lens having a depth of focus D in imager space; and (c) a tilted polarization splitter located between the light modulating panel and the projection lens, said polarization splitter comprising a substrate having a thickness T such that the astigmatism introduced by the substrate at its tilted angle is less than or equal to D.

In addition to the foregoing, during use, the optical system will also include an illumination system, with the tilted polarization splitter being located between the illumination system and the light modulating panel.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed.

The accompanying drawings, which are incorporated in and constitute part of the specification, illustrate various aspects of the invention, and together with the description, serve to explain the principles of the invention. It is to be understood, of course, that both the drawings and the description are explanatory only and are not restrictive of the invention.

Figure 1:
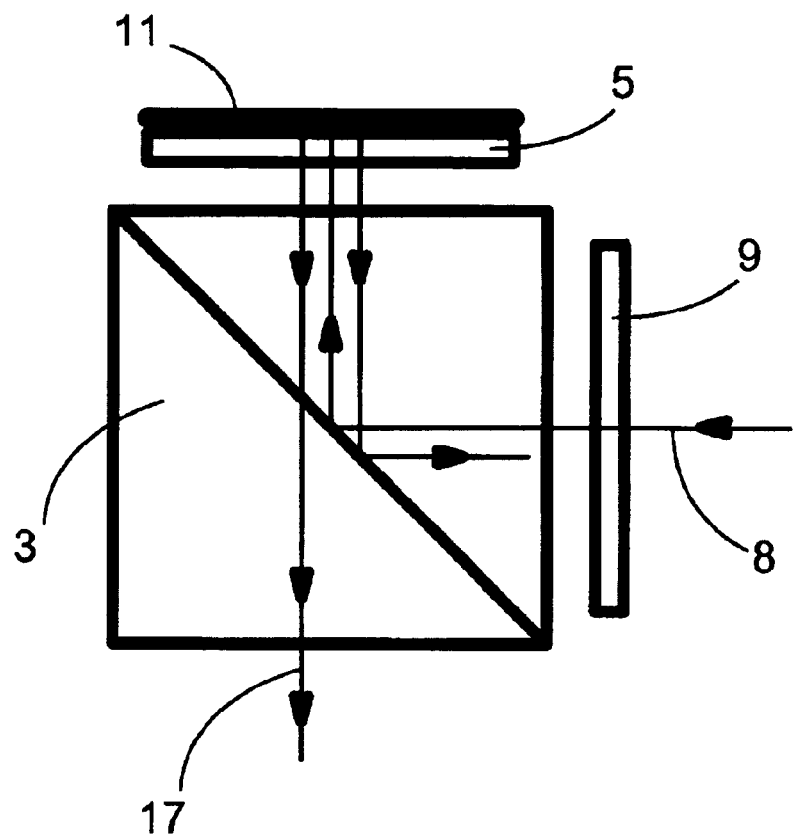
FIG. 1 is a schematic drawing of a prior art polarization arrangement which employs a polarization beam splitter and a quarter wave plate.

The reference numbers used in the drawings correspond to the following:

| | |
|---|---|
| 3 | PBS |
| 5 | quarter wave plate |
| 7 | illumination system |
| 8 | light from illumination system |
| 9 | polarizer |
| 11 | light modulating panel |
| 13 | polarization splitter (e.g., wire grid polarizer) |
| 14 | polarization splitter substrate |
| 15 | projection lens |
| 17 | light to projection lens |

DETAILED DESCRIPTION OF THE INVENTION

Figure 2:
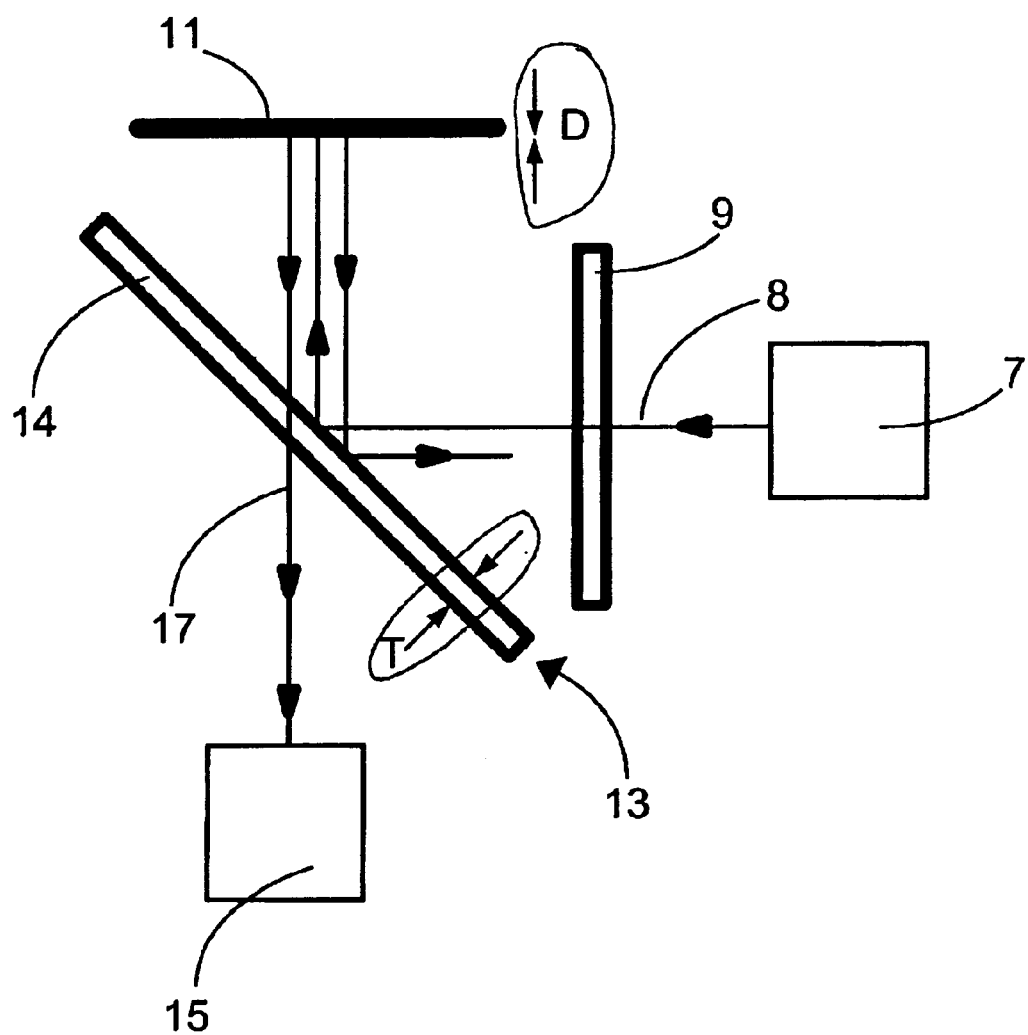
FIG. 2 is a schematic drawing of a polarization arrangement in accordance with the invention which employs a tilted polarization splitter having a substrate which does not generate unacceptable levels of astigmatism.

A schematic of the inventive layout is shown in FIG. 2. The polarization beam splitter of FIG. 1 is replaced with, for example, a wire grid polarizer 13. See, for example, WO 01/09677 entitled "Image Projection System with a Polarizing Beam Splitter" which was published on Feb. 8, 2001 and Perkins et al., U.S. Pat. No. 6,122,103 entitled "Broadband Wire Grid Polarizer for Visible Spectrum" which issued on Sep. 19, 2000, the content of each of which is incorporated herein by reference. The polarization properties of a wire grid polarizer are similar to the properties of a PBS diagonal: it transmits P polarization and reflects S. Light from the illumination system 7 goes through an initial polarizer 9 (S polarizer) and reflects from the wire grid polarizer 13 tilted 45 degrees as shown in FIG. 2.

This tilted polarizer provides the separation of light reflected from the reflective liquid crystal display 11, e.g., LCoS: light reflected from "on" pixels has 90 degrees of polarization rotation and passes through the wire grid polarizer into the projection lens 15; light reflected from "off" pixels has the same polarization as incoming light and is disposed of in the direction of the illumination system 7.

The substrate 14 for the wire grid structure is a plane parallel plate. A tilted plate in the back working space of a projection lens creates astigmatism, which reduces the image quality on the screen.

In accordance with the invention, to reduce this negative effect, the thickness of the substrate (plane parallel plate) is made very small (e.g., about 0.15 mm). With this thickness the astigmatism is practically negligible.

Table 1 shows the amount of astigmatism induced by various thicknesses of tilted (45 degrees) plane-parallel plates composed of glass. See Smith, Warren J., *Modern Optical Engineering: The Design of Optical Systems,* 2nd edition, in the Optical and Electro-Optical Engineering Series, Robert E. Fischer and Warren J. Smith, series editors, McGraw-Hill, New York, 1990, page 96–99, and, in particular, page 99, the content of which is incorporated herein by reference.

A typical f-number of a projection lens designed to be used with a LCoS is 2.8. An acceptable (not noticeable) blur at the imager is generally about one pixel and a representative pixel size for a LCoS is 9 microns. Accordingly, a 2.8 f-number corresponds to a depth of focus in imager space of +/−0.025 mm, where imager space is the space between the LCoS and the projection lens, i.e., it is the space where the LCoS is located. See the above W. Smith text at pages 145–148. Because there is no optical power between the LCoS and the projection lens, this depth of focus value applies throughout imager space. The data in Table 1 show that the astigmatism created by a tilted plane-parallel plate with a thickness of 0.15 mm is within this depth of focus, which means that it can be ignored.

It should be noted that a depth of focus of +/−0.025 mm based on pixel size and projection lens f-number is functionally the same as the depth of focus which results from considering the resolution of the human eye (1.5 arc minutes) as defining acceptable blur. In particular, the required depth of focus in imager space for a human eye located approximately 2 meters from a screen upon which a 70× image of a light modulating panel has been projected is approximately +/−0.035 mm, and thus from Table 1, the astigmatism of a substrate having a thickness which is less than or equal to, for example, 0.15 millimeters is again within this depth of focus and can be ignored.

More generally, in accordance with the invention, a tilted polarization splitter (e.g., a wire grid polarizer) is used between an illumination system and a pixelized panel which comprises a substrate having a thickness such that the astigmatism introduced by the substrate at its tilted angle (e.g., 45 degrees) is less than or equal to the depth of focus in imager space of the projection lens used to image the pixelized panel onto, for example, a screen.

An example of a plane-parallel plate that can be used as the substrate of a wire-grid polarizer in accordance with the invention is Premium Cover Glass (Fisher Scientific, catalog #12548C).

It should be noted that in addition to solving the astigmatism problem, this arrangement is also insensitive to (1) non-flatness of the plane parallel plate and (2) thermal deformation of the plate. The insensitivity to thermal deformation is particularly important because the plate will normally be mounted at room temperature, but operating temperature is about 50–60 degrees C., which creates thermal deformation of the plate. Because the plate is very thin, it does not significantly deform the wavefront of light passing thorough it, and thus the projection lens can "look through" the plate even if it is deformed.

Using a wire grid polarizer instead of a PBS also means that a quarter wave plate for compensation of skew rays' depolarization is not needed. This, in turn, excludes the very precise alignment of this component from the assembly process. It also solves the problem of contrast non-uniformity associated with changes in the properties of the quarter wave plate with temperature.

Although specific embodiments of the invention have been described and illustrated, it is to be understood that modifications can be made without departing from the invention's spirit and scope. For example, instead of a wire grid structure, a polarizing birefringence film can be used on the ultra thin substrate, such as that manufactured by 3M under the tradename 3M CARTESIAN POLARIZER (see Private Line Report on Projection Display, Volume 7, No. 11, Jul. 20, 2001, pages 6–8).

Similarly, the above described ultra thin substrate can be used with a polarization coating instead of a wire grid structure. This configuration has the same benefits (i.e., no astigmatism and low sensitivity to non-flatness and deformation), but still requires a quarter wave plate for compensation of the skew rays' effect. For this embodiment of the invention, the angle of the surface of the polarization coating with respect to the optical axis may differ from 45 degrees to achieve an effective incidence angle for light impinging on the coating. Tilt angles other than 45 degrees can also be used with other polarization separating mechanisms, such as the wire grid polarizers and polarizing birefringence films discussed above.

As another variation, free-raster LCD panels which are addressed directly using light from a CRT can be used in the practice of the invention. Along these same lines, the invention is not intended to be limited to light modulating panels (valves) now known but is intended to include any and all panels which may be developed in the future.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| Thickness (mm)    | 1.0    | 0.75   | 0.5    | 0.25   | 0.15  |
|-------------------|--------|--------|--------|--------|-------|
| Astigmatism (mm)  | −0.269 | −0.202 | −0.135 | −0.067 | −0.04 |

What is claimed is:
1. An optical system comprising:
(a) a light modulating panel comprising a plurality of pixels, said pixels having a pixel size which defines an acceptable blur at the panel;

(b) a projection lens for forming an image of the light modulating panel, said projection lens and said acceptable blur defining a depth of focus D in imager space; and (c) a tilted polarization splitter located between the light modulating panel and the projection lens;

wherein the overall structure of said polarization splitter is suitable for mounting the splitter in the optical system and wherein the splitter comprises a substrate having a thickness T such that the astigmatism introduced by the splitter when mounted at its tilted angle using said overall structure is less than or equal to D.

2. The optical system of claim 1 wherein D is approximately 0.05 millimeters.

3. The optical system of claim 1 wherein T is approximately 0.15 millimeters.

4. The optical system of claim 1 wherein the polarization splitter is tilted at an angle of approximately 45°.

5. The optical system of claim 1 wherein the polarization splitter is a wire grid polarizer.

6. The optical system of claim 1 wherein the polarization splitter comprises a polarization coating.

7. The optical system of claim 1 wherein the polarization splitter comprises a polarizing birefringence film.

8. The optical system of claim 1 wherein the light modulating panel is a reflective liquid crystal display.

9. The optical system of claim 1 wherein the light modulating panel is a liquid crystal on silicon panel.

10. An optical system comprising:

(a) an illumination system;

(b) a light modulating panel comprising a plurality of pixels, said pixels having a pixel size which defines an acceptable blur at the panel;

(c) a projection lens for forming an image of the light modulating panel, said projection lens and said acceptable blur defining a depth of focus D in imager space; and (d) a tilted polarization splitter located between the illumination system and the light modulating panel and between the light modulating panel and the projection lens;

wherein the overall structure of said polarization splitter is suitable for mounting the splitter in the optical system and wherein the splitter comprises a substrate having a thickness T such that the astigmatism introduced by the splitter when mounted at its tilted angle using said overall structure is less than or equal to D.

11. The optical system of claim 10 wherein D is approximately 0.05 millimeters.

12. The optical system of claim 10 wherein T is approximately 0.15 millimeters.

13. The optical system of claim 10 wherein the polarization splitter is tilted at an angle of approximately 45°.

14. The optical system of claim 10 wherein the polarization splitter is a wire grid polarizer.

15. The optical system of claim 10 wherein the polarization splitter comprises a polarization coating.

16. The optical system of claim 10 wherein the polarization splitter comprises a polarizing birefringence film.

17. The optical system of claim 10 wherein the light modulating panel is a reflective liquid crystal display.

18. The optical system of claim 10 wherein the light modulating panel is a liquid crystal on silicon panel.

19. The optical system of claim 10 further comprising a polarizer between the illumination system and the polarization splitter.

20. A polarization splitter comprising a substrate whose thickness is less than or equal to 0.15 millimeters, wherein the overall structure of said splitter is suitable for mounting the splitter in an optical system and, when mounted at 45 degrees in air using said overall structure and transmitting divergent light, the splitter generates less than 0.05 millimeters of astigmatism.

21. The polarization splitter of claim 20 wherein the splitter is a wire grid polarizer.

* * * * *